Dec. 5, 1944.  F. O. CALVIN ET AL  2,364,268
SOUND PROJECTION OPTICAL SYSTEM
Original Filed Jan. 9, 1940
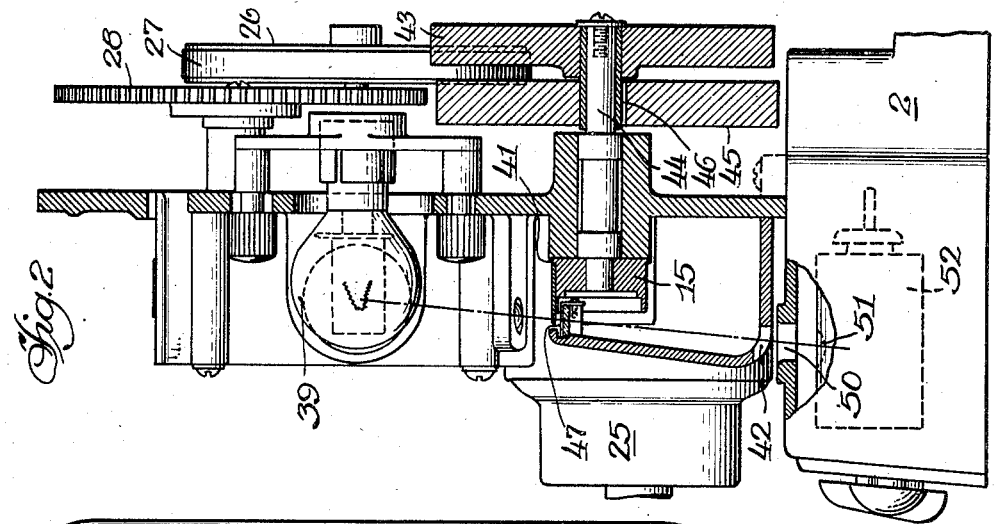
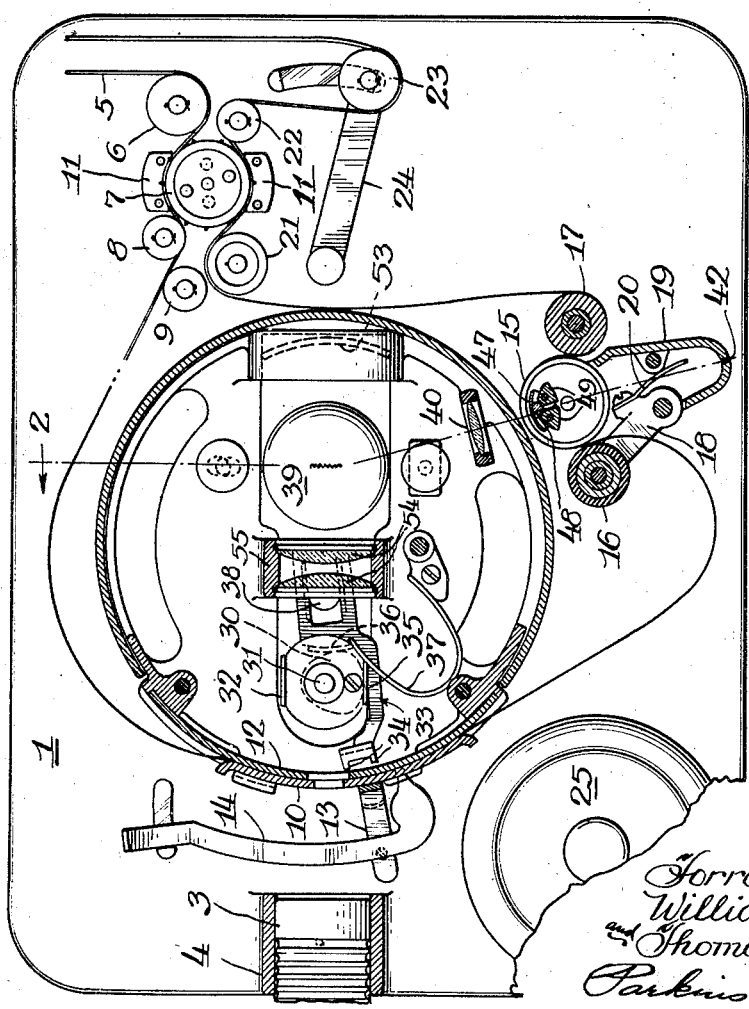
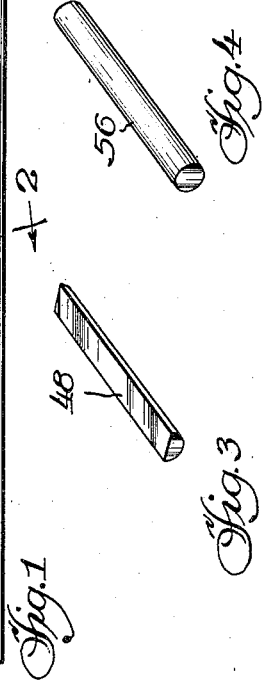
INVENTORS
Forrest O. Calvin
William G. Wilson
and Thomas R. Smith
Parkinson + Lane Attys Patented Dec. 5, 1944

2,364,268

UNITED STATES PATENT OFFICE 2,364,268

SOUND PROJECTION OPTICAL SYSTEM

Forrest O. Calvin, Kansas City, Mo., William G. Wilson, Merriam, Kans., and Thomas R. Smith, Newton, Iowa, assignors to Movie-Mite Corporation, Kansas City, Mo., a corporation of Missouri Original application January 9, 1940, Serial No. 313,088. Divided and this application October 13, 1942, Serial No. 461,839

6 Claims. (Cl. 88—24)

The present invention relates to a sound motion picture projector for the simultaneous and synchronous projection of sound and motion pictures, and more particularly to a sound projection optical system utilizing an extremely simple cylindrical or semi-cylindrical lens as the objective lens and a die-cast member as the optical mount in which is incorporated a mechanical slit, which scans the sound track.

The present invention and application is a division of our co-pending application, Serial No. 313,088, filed January 9, 1940, and which has become Patent No. 2,319,111, dated May 11, 1943.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a fragmentary view in vertical cross-section through the projector and optical system.

Fig. 2 is a fragmentary view in vertical cross-section taken on the line 2—2 of Fig. 1.

Fig. 3 is a perspective view of the semi-cylindrical form of objective lens.

Fig. 4 is a view similar to Fig. 3 but of a cylindrical form of lens.

Referring more particularly to the novel embodiment disclosed in the drawing, the invention is shown as embodied in a sound motion picture projector in which the component parts are suitably supported upon a main frame 1 and suitable base 2, the entire assembly being such as to be mounted in a carrying case (not shown). In the front of the assembly is provided a suitable lens 3 adjustably mounted in a lens mount 4 which may be formed integral with or secured to the main supporting frame or plate 1.

In the operation of the projector, the film 5 is fed from suitable feed rolls mounted thereabove over a roller 6 and thence over the upper surface of a sprocket 7, and between guide rollers 8 and 9 to the picture aperture positioned in a pressure plate 10. The film travels in such a path as to require a minimum of supporting parts or rollers, with the rollers so placed as to make the film path of such shape or contour that it will not be subjected to sharp bends or other mishandling. The film 5 is held onto the top of the sprocket 7 by means of the guide rollers 5, 8 and 9 and a sprocket retainer 11.

The pressure plate 10 holds the film between its surface and the surface of an apertured gate plate 12 by means of pressure applied by a lever spring 13. Framing is accomplished by a moving lever 14, which in turn moves the aperture in the pressure plate up or down to the correct alignment. The moving lever 14 rests in the film groove in the gate plate 12, and the pressure plate is moved up and down in this groove by operation of the lever 14, thereby framing the film correctly. The pressure plate 10 and the gate plate 12, as well as all rollers contacting the film at any point in the projector, with the exception of the sound drum, are preferably relieved over the sound track and picture areas of the film for providing film protection. The film after leaving the confines of the pressure plate 10 and gate plate 12 is looped or guided over the sound drum 15 and held against it by means of a padded roller 16, and as it leaves the sound drum it is guided by means of a roller 17. The roller 16 is shown as mounted on an arm 18 pivotally supported on the sound drum cover 19. This arm is provided with a spring 20 fastened thereto and engaging the interior of the cover in such manner as to hold the roller 16 against the sound drum 15 with the desired tension. The film in leaving the sound drum is then passed over a guide roller 21, and thence over the under surface of the sprocket 7 and guide roller 22.

The rollers 21 and 22 guide the film over the bottom surface of the sprocket, and these rollers are so located that the natural tendency of the film to straighten out from the bends imposed thereon keeps the film on the sprocket. The sprocket retainer 11 also locks the film on its lower surface in the same manner as previously described for the upper surface of the sprocket. Thus the top surface of the sprocket serves as a pull-down and feed sprocket, and the bottom surface serves as a sound, take-up and hold-back sprocket. After passing over the guide roller 22, the film then passes over a snubber roller 23 which is mounted upon a spring controlled arm 24. From there the film 5 passes onto the back-up reel (not shown).

The power unit for feeding the film and for operating the projector comprises a motor 25 driving a pulley 26 through a belt 27. This pulley comprises a train of gears 28, one of the gears driving the sprocket 7, and another the cam 30 pinned or keyed to the shaft 31. Pinned or otherwise secured to the cam is a shutter 32. The shaft 31 serves to drive the projector mechanism, and the cam 30 and shutter 32 operate together to form lateral guides for the claw 33. This claw is provided with projections or teeth 34 which engage the film 5, and the motion of this claw is controlled by the cam 30, which bears upon the flat portion or bottom 35 of the follower surface, and on the convex back follower surface 36 of the claw. A spring 37 holds the claw against the cam during its motion and serves to drive the claw in its upward and forward travel, with the rear end of the claw being pivoted upon a bushing 38.

The projector is so constructed and arranged as to require but a single lamp or light source 39 for projection of the picture and for scanning the sound track. This lamp is positioned on the center line of the film and throws light through the sound condenser 40 onto the sound track of the film as it passes over the sound drum 15. The film is guided laterally at this point by means of a flange 41 on one side of the sound drum, and the other side by the sound guide roller 17. The sound drum cover 19 is secured to the main frame or plate 1, and its bottom or lower end is split at 42 to form a mechanical slit.

A flywheel 43 is pinned or keyed to the sound drum shaft 44 and serves as a filter fly wheel with the shaft rotated upon ball bearings and driven by the resilient film loop. A stabilizer ring 45 floats upon the shaft 44 and is provided with a hole 46 which is somewhat larger than the shaft. Since this assembly is driven by the flexible loop or film which is supported upon the sound drum and the sprocket 7, any unequal motion of the film would tend to set up oscillations which would require some time for friction in the ball bearings to dampen out. By means of the present construction, the stabilizer ring 45 laterally rides or floats upon the shaft 44 in that it is in no wise connected thereto, and the stabilizer ring thereby dampens out any oscillations and imparts a smooth motion to the film at the sound scanning point.

To one side of the sound drum 15 and secured in the sound drum cover 19 is a mask 47 which serves as a projection aperture for the sound track of the film. Immediately behind or below the top part of this sound drum cover, which is preferably in the form of a hollowed out casing, is mounted a semi-cylindrical lens 48 upon supports 49. This lens projects an enlarged image of the sound track of the film upon the mechanical slit 42 from where the light beam passes through an opening 50 provided in an amplifier base 2, and corresponding opening 51 in the shield 52 for the photo-electric cell. The reflector 53 mounted to the rear of the lamp, and the condensers 54 mounted to the front of the lamp and within the cylindrical housing 55, gather light from the lamp.

If desired, a lens may be mounted between the mechanical slit 42 and the photo-electric cell to give the necessary spread of the light beam over the surface of the photo-electric cell cathode.

The lens 48, as shown in Fig. 3, may be of semi-cylindrical shape such as a section or length of glass rod of that contour, or it may be in the form of a cylindrical glass rod 56, as more clearly shown in Fig. 4. In either form of the invention, the lens is of relatively cheap but efficient construction.

Having thus disclosed the invention, we claim:

1. In a motion picture projector, a sound optical system including a sound drum over which the film passes, a light source for projecting a beam of light upon the sound track of the film as it passes over the sound drum, a mechanical slit which scans the sound track of the film, and a substantially cylindrical lens located below the film and between the light source and mechanical slit and the latter substantially in the focal plane of the lens for projecting an enlarged image of the sound track upon the slit.

2. In a motion picture projector, a sound optical system including a light source, a sound drum over which the film is passed, a sound drum cover, a mask located within the cover providing a projection aperture for the sound track of the film, a lens comprising a length of light transmitting rod located within the drum cover adjacent its upper end and directly below the mask, a mechanical slit provided at the lower end of the cover upon which an enlarged image of the sound track is projected by the lens, and a photo-electric cell positioned directly below the slit.

3. In a motion picture projector, a sound optical system including a light source, a sound drum over which the film is passed, a sound drum cover, a mask located within the cover providing a projection aperture for the sound track of the film, a lens comprising a length of light transmitting rod located below the mask, and a mechanical slit substantially parallel to the axis of the rod provided at the lower end of the cover upon which an enlarged image of the sound track is projected by the lens.

4. In a motion picture projector, a sound optical system including an optical mount provided with a mechanical slit at its lower end for scanning the sound track of the film, a sound drum over which the sound film passes, and a single objective lens consisting of a light transmitting rod located between the film and slit and substantially parallel to the slit for projecting an enlarged image of the sound track of the film upon the slit.

5. In a motion picture projector, a sound optical system comprising a light source, a sound drum, a sound drum cover, a mask serving as a projection aperture for the sound track of the film, a substantially cylindrical lens, a mechanical slit provided in the lower end of the drum cover, and a photo-electric cell positioned below and in alignment with the slit, all so constructed and arranged that a beam of light from the light source is thrown onto the sound track of the film as it passes over the drum, then through the lens which projects an enlarged image of the sound track upon the mechanical slit from where the light beam passes to the photo-electric cell.

6. In a motion picture projector, a sound optical system comprising a light source, a condenser for concentrating light on the sound track of the film, a light transmitting rod for projecting an enlarged image of the sound track, and a mechanical slit which scans the enlarged image, the light transmitting rod being located between the film and mechanical slit and substantially parallel to the slit for projecting an enlarged image of the sound track upon the slit.

FORREST O. CALVIN.
WILLIAM G. WILSON.
THOMAS R. SMITH.